United States Patent Office 2,802,837
Patented Aug. 13, 1957

---

2,802,837

3-(2-FORMAMIDOETHOXY)PHTHALIDE

Donald D. Wheeler and David C. Young, Midland, Mich., assignors to The Dow Chemical Company, Midland, Mich., a corporation of Delaware No Drawing. Application April 30, 1956,
Serial No. 581,371

1 Claim. (Cl. 260—343.3)

This invention is directed to 3-(2-formamidoethoxy)-phthalide having the structure

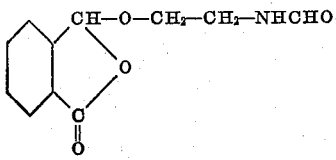

This new compound is an amber-colored oil, soluble in organic solvents such as benzene and acetone, and substantially insoluble in water. It is valuable as a germicide and adapted to be employed for the control of bacterial organisms.

The new compound of this invention is conveniently prepared by causing phthalaldehydic acid to react with N-(2-hydroxyethyl)formamide. The terms "phthalaldehydic acid" and "3-hydroxyphthalide" refer to a compound having the structure

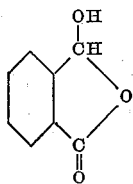

Phthalaldehydic acid is often represented in the literature as having the structure

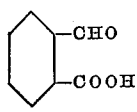

However, the acid employed in this invention and prepared as hereinafter described exists almost entirely in the closed ring, 3-hydroxyphthalide structure, as observed from a study of its infrared absorption spectrum. The infrared spectrum supports the closed ring 3-(2-formamidoethoxy)phthalide structure for the product.

In a method for carrying out the reaction, phthalaldehydic acid and N-(2-hydroxyethyl)formamide are mixed and heated in the temperature range of from 90° to 120° C. Reaction takes place with the formation of 3-(2-formamidoethoxy)-phthalide product and water of reaction. The latter begins to reflux during the heating period and the mixture is thereafter maintained under reflux for one to four hours. On completion of the heating, the reaction mixture is poured into water whereupon an organic product phase and an aqueous phase are formed. The aqueous phase is decanted from the organic phase and the latter washed with water and then dissolved in benzene. The benzene solution is heated to remove first the water as a benzene-water azeotrope and then the benzene and to obtain the desired product as residue.

In a representative operation, 26.7 grams (0.3 mole) of N-(2-hydroxyethyl)formamide and 45.0 grams (0.3 mole) of phthalaldehydic acid were mixed and heated in the temperature range of from 120° to 130° C. under reflux for three hours. The mixture was then cooled to 90° C. and poured into 700 milliliters of warm water whereupon an insoluble oil separated. The aqueous solution was decanted therefrom and the oil dissolved in benzene. The benzene solution was heated to distill water and benzene and to obtain N-(2-hydroxyethyl)formamide product as residue. The latter was an amber-colored oil having a refractive index $n_D^{60}$ of 1.5700.

The new compound of the present invention is useful as an insecticide to be employed for the control of plant-infesting mites. In a representative determination, 100 percent controls were obtained when bean plants infested with spider mites were dipped or sprayed with an aqueous dispersion containing as toxic ingredient, 0.24 grams of 3-(2-formamidoethoxy)phthalide per 100 milliliters of dispersion.

The phthalaldehydic acid employed in this invention may be prepared by phtochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid containing 10 percent ferric chloride solution to obtain phthalaldehydic acid, as more fully disclosed and claimed in a copending application of James D. Head and Owen D. Ivins, Serial Number 279,682, filed March 31, 1952, now Patent 2,748,162.

We claim:
3-(2-formamidoethoxy)phthalide.

References Cited in the file of this patent

UNITED STATES PATENTS 2,717,899    Cronheim et al. -------- Sept. 13, 1955

OTHER REFERENCES

Mayer et al.: Chem. Abst., vol. 24, p. 838 (1930).
Samdahl et al.: Bull. Soc. Chem., vol. 5, pp. 1573–80 (1938).